Patented Aug. 14, 1934

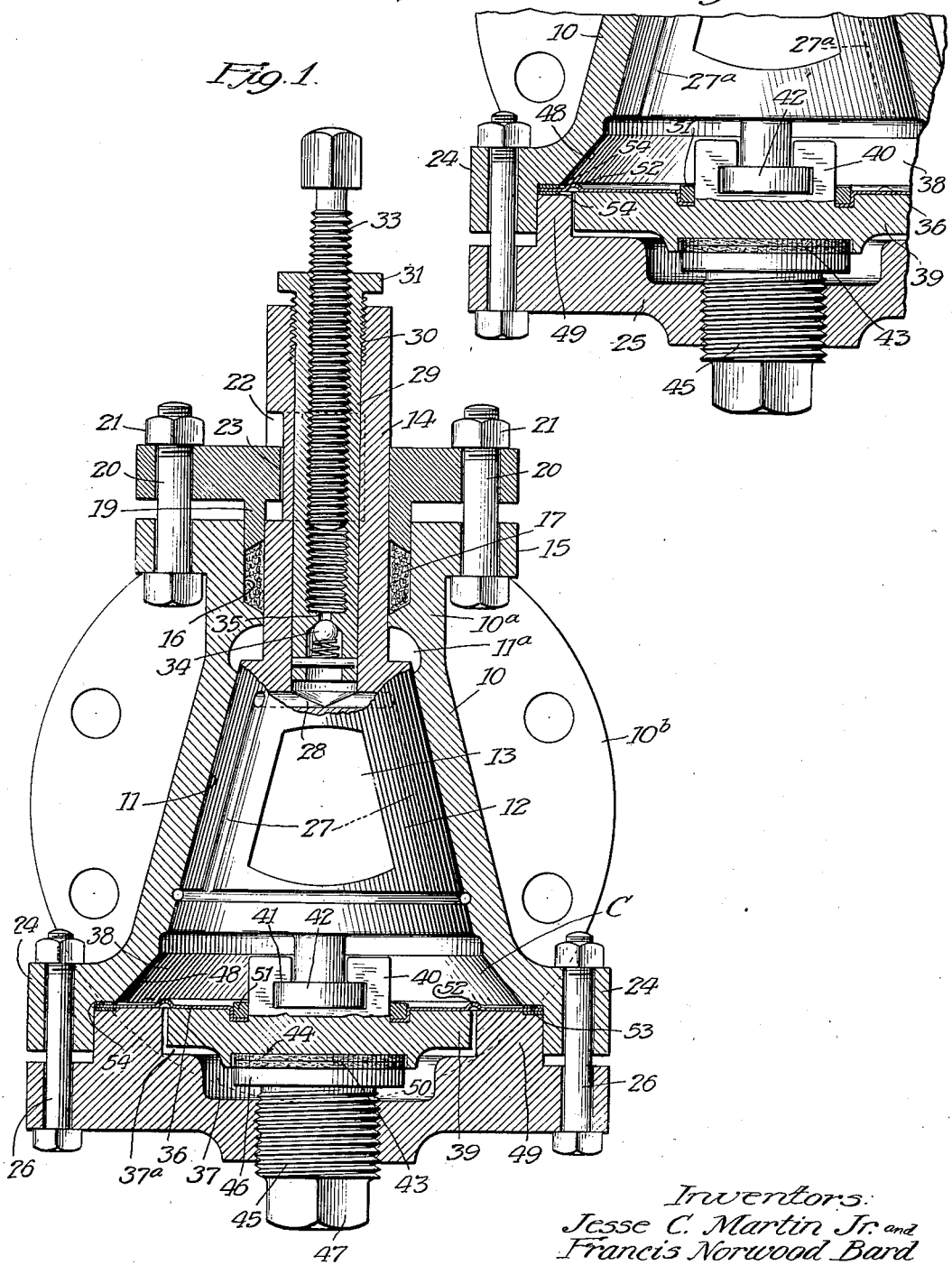

1,970,241

UNITED STATES PATENT OFFICE

1,970,241

LUBRICATED PLUG VALVE

Jesse C. Martin, Jr., Los Angeles, Calif., and Francis Norwood Bard, Highland Park, Ill., assignors to Walworth Patents Inc., Boston, Mass., a corporation of Massachusetts Application May 22, 1929, Serial No. 365,169

14 Claims. (Cl. 251—93)

The present invention relates in general to valves and more particularly to valves having a lubricant introduced between the valve member and the valve seat, and has special reference to the provision of an improved type of plug valve of the character referred to, wherein lubricant is employed to prevent sticking of the valve upon its seat and to prevent leakage of fluid therebetween.

Among the more important objects of the present invention are the provision of an improved means for introducing a lubricant into a valve mechanism, particularly, a valve of the well known turning plug type; the provision of an improved valve structure and lubricating means therefor incorporating therein auxiliary means for lifting the valve from its seat by the action of the lubricant under pressure; the provision of an improved means for maintaining a supply of the lubricant in effective position; the provision in a lubricated valve of an improved construction of lubricant chamber whereby to increase the capacity of the chamber and thereby increase the intervals at which it is necessary to replenish the lubricant; the provision in an improved valve structure of an improved pressure sensitive element for displacing the valve away from its seat to permit the introduction of a lubricant to the seating surface of the valve and casing; the provision of an improved means for permitting of the simplified adjustment of the valve structure and lubricating means; the provision of a lubricated plug valve structure incorporating therein an improved arrangement whereby cleaning and repairing of the parts is facilitated; and the provision of a valve of the character referred to wherein the means for holding the valve normally on its seat is excluded from contact with the contents of the pipe line.

This invention also includes an improved means whereby the turning plug of a plug cock or the like may be lifted from its seat for lubricating purposes by the force of lubricant introduced under pressure thereinto between the seating surfaces of the plug and casing, or where, if desired, this unseating of the plug for lubricating purposes may be accomplished by an improved sealing means, depending upon the character of the services for which the plug is designed and permitting of the employment of the device in pipe lines carrying corrosive fluids; the provision of an improved plug valve wherein pressures on the sealing diaphragm tending to lift the valve from its seat are equalized; the provision of an improved means for maintaining the plug valve on its seat including yieldingly resistant means and means for adjusting the tension of same; and the provision, in combination with means for introducing the lubricant between the surface of contact between the valve and casing, of an auxiliary means for exerting pressure in one direction on the valve for aiding the raising of the same from its seat which also prevents leakage of the valve at its base during such lubrication.

The foregoing and such other objects and advantages as may appear to be pointed out as this description proceeds are attained in the alternative forms of the invention shown in the accompanying drawings in which:

Figure 1 is a vertical sectional view of a plug valve incorporating the improvements of our invention; and Figure 2 is a fragmentary view similar to Figure 1 of an alternative form of the device.

Figure 3:
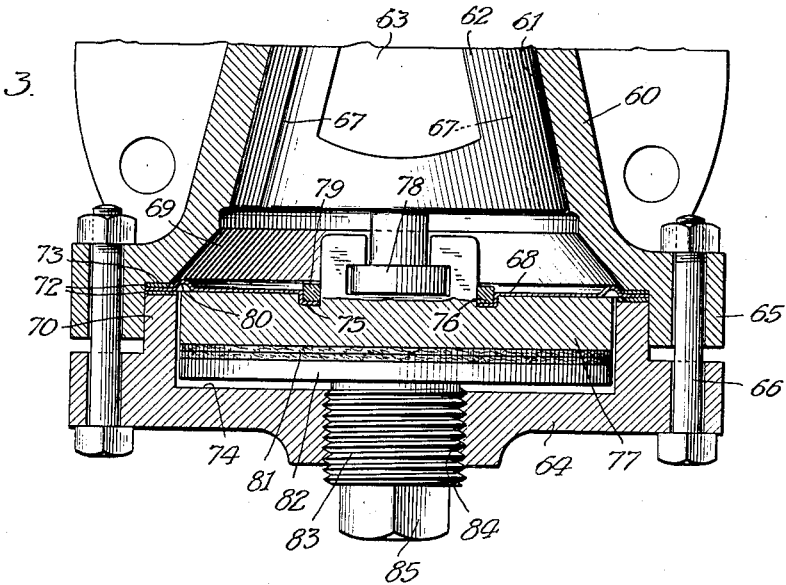
Figures 3 and 4 are similar views of alternative forms of this invention.

Referring to the drawings we will first include a description of Figure 1. Here the invention includes a valve body or casing 10 having a tapered valve seat 11 against which is engaged a complementally formed valve member 12, which latter is provided with a transverse port 13 which is adapted to register with the conventional ports in the casing not shown. At the upper end of the valve seat 11, we provide an annular enlarged recess 11a facilitating the accurate machining of the valve seat and preventing interference between the upper end of the valve member 12 and the extending wall 10a of the casing 10. This annular chamber 11a becomes filled with lubricant and further affords a seal against leakage in this locality, although this is taken care of primarily by a packing which will be described hereinafter.

The plug valve member 12 is provided on its upper end with a tubular extension 14 which constitutes an operating stem for the valve projecting through the extended portion 10a of the casing 10 and serving as a container for lubricant and lubricant feeding means which will presently be described.

The upper end of the stem 14 may be suitably shaped for the application of a wrench or other tool for rotating the plug in its seat. The casing is provided with flanges 10b, only one of which is shown for facilitating the connection of the parts of the pipe line to the valve casing.

The upper end of the extension 10a is provided with a radially extending annular flange 15 and internally is formed with an annular packing containing recess 16 in which a suitable packing element 17 is contained.

A gland 18 is provided with an annular flange 19 resting upon the packing and snugly fitting the valve stem 14. The gland and the flange 15 are suitably apertured to receive retaining bolts 20, 20, the nuts 21 of which serve to impart movement to the gland for compressing the packing.

In order to form a limit stop for the plug member, that is, to control its movement within limits of 90°, for example, we provide an arcuate notch 22 in the external face of the stem 14 and a lug 23 carried by the gland 18 lies in said arcuate recess for carrying out this purpose.

The lower end of the valve casing, as viewed in Figure 1 is open, a suitable closure being provided therefor. The opening in the bottom of the casing is bordered by an apertured annular flange 24 and a closure 25 is engaged with said flange and brought toward the same into clamping and closing position by the provision of bolts 26, 26.

The valve member is adapted to be yieldingly supported on its seat, that is, the rotatable member 12 engages the seat 11 under the tension of yieldingly resistant means which will be described hereinafter, so that said valve member is susceptible of not only maintaining a tight fit on its seat and thereby performs its function as a valve properly, but may be lifted from its seat to permit the introduction of a lubricant.

For this last mentioned purpose, we provide grooves 27 in the surfaces of contact between the valve and the casing, these grooves being shown to be in the surface of the valve member. The grooves communicate by a passageway 28 with the internal bore of the stem 14 which latter contains a lubricant reservoir 29 externally threaded at 30 for engagement with the stem and provided with polygonal outer end 31 facilitating adjustment of the reservoir 29, said reservoir being internally threaded as at 32 and having a screw thread plunger 33 engaging the internal threads for placing a lubricant contained in the reservoir under pressure.

In order to prevent reflux of the lubricant into the reservoir, we provide a check valve 34 operating to normally close the outlet port 35 of said reservoir 29.

From the foregoing, it will be observed that upon introduction of lubricant into the reservoir and a placing of this lubricant under pressure by the plunger 33, the lubricant will be caused to flow into the grooves between the seating surface of the plug and casing and thereby lift the plug valve member from its seat. The grooves 27 terminate short of the bottom of the plug member so that with the exception of a small amount of lubricant which may leak past the lower end of the valve member, lubricant does not and is not intended to enter beneath the plug valve member. However, if the lubricant does so enter, or if contents of the pipe line enter below the plug valve member, the pressures, if any, thereby set up are equalized by the structure which is hereinafter described.

It will be observed that in the construction of the reservoir 29 and the plunger 33 we are enabled to increase the capacity of the bore of the stem 14 for lubricant and thereby increase the periods of time elapsing in which the plug has to be replenished with lubricant.

In order to equalize pressures which may be set up beneath the plug valve member and which by cumulative effect might tend to prevent the plug valve member from being raised from its seat for lubricating the seating surfaces, we provide a flexible partition member in the chamber formed beneath the larger end of the valve member and the closure 25 so that this chamber, which, for convenience, we shall designate C, is effectually divided into two compartments. One of these compartments is the portion between the flexible diaphragm 36 and the closure 25 and designated 37. The other is that compartment between the diaphragm 36 and the plug member 12 and adjacent wall of the casing and designated 38.

The diaphragm includes the flexible portion 26 and a rigid though movable plate 39. This plate 39 is provided with an axial extension 40 transversely recessed as indicated at 41 to receive a complementally formed axial extension 42 affixed to the plug valve member so that any movement of the plug valve member axially of the casing, will be imparted to the rigid member 39, but rotative movement of the plug valve member will be readily accomplished. There is substantially no lost motion afforded axially between the extension 42 and the recess 41 so that the valve will be effectually retained on its set by the member 39. This latter is accomplished by the insertion of a resilient pad 43 in a recess 44 formed axially in the member 39, a threaded shank 45 extending through the closure 25 and having an enlarged disk-portion 46 which is adapted to engage the pad 43. The outer end of the shank 45 is squared as at 47 to permit the application of a turning tool thereto so as to adjust the tension exerted by the resilient packing 43 on the rigid plate member 39 and in turn on the plug valve member. It is to be understood that the plate 39 is axially movable in the compartment 37, the latter being annularly recessed as at 37a to facilitate such movement of the plate 39.

Ordinarily with such a construction, any pressures which were established in the compartment 38 would tend to cause a downward movement of the plate 39 and thus pull the valve off its seat, such a pressure being established between the inclined annular surface 48 and so much of the plate 39 as is exposed beneath this surface. In other words, there would be a vertical component of force exerted. In order to prevent this and yet in order to form a seal at this point and in order to equalize these pressures, the closure 25 is provided with an annular inwardly extending abutment flange 49 which is of sufficient thickness to have its inner periphery lie well under the surface 48, thus the vertical component of force which would be exerted at this point, would be applied to relatively fixed surfaces and no movement of these surfaces would occur.

In order to seal at this point, and prevent the contents of the pipe line reaching the resilient pad 43 or any other resilient means employed for this purpose, we provide the diaphragm 36 referred to hereinbefore, which is a thin disk of flexible metal or the like having an aperture in the center to receive the extension 40 and provided with an annularly offset flange 50 which lies in a complemental annular groove adjacent to the extension 40 and formed in the plate 39. A retaining ring 51 rests on the flange 50 of the diaphragm 36 in the groove and thus fixedly retains this inner peripheral edge of the diaphragm in said plate. Adjacent the periphery of the plate 39, the diaphragm is provided with an annular offset portion 52 which enhances its flexibility and the outer peripheral edge of the diaphragm is clamped between the abutment flange 49 and the adjacent shoulder 53 formed in the open end of the casing 11 in the bottom of the surface 48. Suitable packing washers 54 are applied at this point to further enhance the sealing function of the diaphragm.

It will be observed that pressures, if any, set up in the compartment 38 will be effectually neutralized by the construction just described. The pressure acting on the opposed surfaces of the valve member and the diaphragm would, of course, tend to cause no movement of the plug relatively to its seat. Any pressures established, to be of any effect, would have to be exerted by the surfaces 48 and said diaphragm, but as the inner edge of the abutment 49 lies below the surface 48 and the diaphragm at this point, no movement of the diaphragm or the plate 39 in response to such pressures will occur. Therefore, the valve will be permitted to be raised from its seat solely by the force of lubricant entering the grooves 27. Of course, this construction does not prevent a movement of the plate 39 against the tension of the resilient pad 43. The diaphragm serves the dual function of affording a seal and of neutralizing the pressures which might become established in the compartment 38 due to leakage of fluid from the pipe line into this compartment or due to the accumulation of lubricant therein. It is not undesirable that lubricant enter the compartment 38 as it will serve the useful function of lubricating the rotating joint between the extension 40 and the member 42.

Referring now to the alternative form of our invention shown in Figure 2, the latter differs from the invention shown in Figure 1, principally in that in this form the diaphragm and reinforcing plate therefor serve the function of lifting the valve from its seat as well as forming a seal for the lower end of the valve casing.

Referring in detail to Figure 2, with certain exceptions, the same reference characters are employed as in Figure 1. The casing 10 in this instance is provided with the flange 24 and the closure 25 is similarly provided with an internally extending flange 49. The joint composed of extension 40 and the member 42 on the valve member 12 are substantially identical with Figure 1, and the plate 39, pad 43, shank 45 and the connecting means 51 between the diaphragm 36 and the plate 39 are all substantially identical with the corresponding elements in Figure 1.

However, in order to permit the diaphragm and plate to pull the valve member off its seat, the lubricant grooves 27a in the valve member 12a are extended so as to communicate with the compartment 38 and thereby establish a pressure in this compartment when filled with lubricant. This pressure will, as a result, operate on the surfaces 48 similarly as in Figure 1. However, in this form, the abutment 49 is made narrower so that a relatively large portion of the diaphragm is exposed to the surface 48 for flexing, that is, the abutment 49 does not extend beneath the diaphragm so as to prevent its movement away from the surface 48 in response to the vertical component of pressure set up at this point.

In view of the fact that the surface 48 is of sufficient area so that an ample vertical component of pressure will be set up, this pressure will act upon the diaphragm to tend to force the plate and diaphragm toward the closure 25 against the tension of the pad 43 and thus facilitate the entrance of lubricant between the seating surfaces of the valve and casing. In order to facilitate the flexing of the diaphragm, the offset annular portion 52 thereof is provided adjacent to the packing washers 54 rather than at some distance therefrom as shown in Figure 1.

The pressure required for lifting the valve from its seat in both instances, in both Figures 1 and 2, may be varied by adjustment of the shank 45 in each case.

In both forms of the invention the plate 39 is rigid and the diaphragm 36 is of resilient material capable of being flexed, but exercising no action one way or the other in the plug or plate other than by force applied externally thereto. In other words, the diaphragm is preferably neutral in its action. This diaphragm may be constructed of thin iron sheet, copper, nickel, steel or the like.

The additional advantage in providing the annular offset portion 52 in the diaphragms 36 resides in the fact that when the valve is moved off its seat, as both inner and outer margins of the diaphragm are fixed, without the offset portions 52, the diaphragm might rapidly lose its desired flexibility and become sheared off or otherwise distorted. Furthermore, the action of the valve in leaving its seat may overcome the retaining action of the abutments 49 and thus pull the margin of the diaphragm out of its sealing position to which it would not return, even when the valve went back to its seat.

It will be obvious that this invention may be employed in the several of its forms with plug valves other than those of the lubricated type, that is, the diaphragm and its supporting means may be of general application to valves.

Referring now to the further alternative form of this invention disclosed in Figure 3, we provide a valve body or casing 60 having a tapered valve seat 61 against which is engaged a complementally formed valve 62, the latter having a transverse port 63 which is adapted to register with the conventional ports in the casing, not shown. The upper portion of the valve, which has been omitted from Figure 3, may be constructed substantially the same as that shown in Figure 1.

The lower end of the valve casing 60 is left open, a suitable closure 64 being provided. The opening in the bottom of the casing is bordered by an apertured annular flange 65, and said closure 64 is engaged with said flange and brought toward the same into clamping and closing position by the provision of ports 66, 66 passing through the apertures in the flange 65 and apertures in the closure.

As in the case of the device shown in Figure 1, the valve is adapted to be yieldingly supported on its seat, that is, the rotatable plug member 62 engages the seat 61 under the tension of yieldingly resistant means similar to that disclosed in Figure 1, but possessing additional characteristics which will be hereinafter described. Thus, the valve member is susceptible of not only maintaining a tight fit upon the seat and thereby performing its function as a valve, but may be lifted, as desired, from its seat to permit of the introduction of a lubricant similar to the form shown in Figure 1. For this last-mentioned purpose, the grooves 67, 67 are provided in the plug member. Of course, these grooves may be placed in the seating surface 61 or in both the seating surfaces of the plug member and seat.

In order to equalize pressures which may be set up beneath the plug valve member, and which by cumulative effect might tend to prevent the plug valve member being raised from its seat for lubricating the seating surfaces, we provide a flexible partition 68 similar to the complemental member shown in Figure 1, said partition being of sheet metal or the like operable under and extending across the bottom of the chamber 69 below the valve member. This partition or diaphragm has its outer peripheral margin held fixedly in position by an annular flange 70 formed on the closure 64, and annular washers 72 between the flange 70 and the diaphragm edge 68 and between the latter and a shoulder 73 formed on the flange 65.

The closure is provided with a circular recess 74 and thus, by the provision of the diaphragm 68 two chambers are provided, one the chamber 69 and the other the chamber 74.

The diaphragm is provided with a central opening, and the inner peripheral edge of said diaphragm is offset, as at 75, in order to be received in an annular recess 76 formed in a movable rigid pressure plate 77. Said pressure plate is provided with a rotatable connection 78 to the plug valve member similar to that shown in Figure 1. A rigid diaphragm retainer in the form of a ring 79 seats on the offset portion 75 of the diaphragm for retention of the same. The diaphragm is provided with an annular transversely curved portion 80 which assists flexing of the diaphragm, this portion 80 being located substantially immediately above the space between the pressure plate 77 and the flange 70.

This form of the device is so far substantially the same as that shown in Figure 1. However, we have found that for valves of large size and heavy pressures it is desirable that the effective area of the pressure plate 77 be increased and also the effective area of the yieldingly resistant means. Therefore, in this form of the invention we provide a resilient pad or plurality of pads, indicated at 81, lying below the pressure plate 77 and on top of a disc member 82. The disc member rests upon the inner end of a pressure plug 83 which is threaded into a suitable axial opening 84 formed in the wall of the closure 64. The outer end of the plug 83 is provided with a polygonal head portion 84 so that a wrench or other tool may be applied thereto for regulating the pressure exerted by the same on the plate 82. This form of the invention operates substantially the same as that form of the invention shown in Figure 1 though it will be observed that we are able to reduce the unit load carried by the pad, and therefore afford a construction suitable to certain service conditions.

Figure 4:
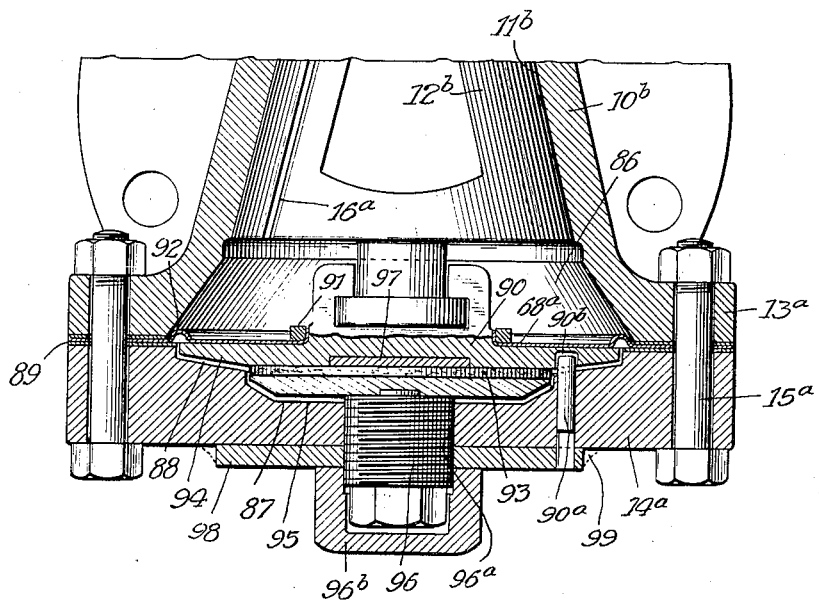

Referring now to the form of the invention shown in Figure 4, this is substantially an incorporation of the general ideas disclosed in Figures 1 and 3. In this instance we provide a valve casing 10b having a tapered valve seat 11b on which is engaged the plug valve member 12b. The casing is open at one end and is provided with an annular flange 13a against which a closure 14a is applied and retained by the provision of bolts 15a.

The plug valve member 12b is provided with a conventional port and also with lubricant grooves 16a.

In order to equalize pressures similarly to the forms shown in Figures 1, 2 and 3, I provide a flexible partition member in the chamber 86 formed beneath the valve plug member and the closure so as to separate this chamber into the two parts shown.

The closure 14a is provided with a circular recess 87 which terminates short of the inner surface of the closure 14a and is further extended, but to a lesser depth, as indicated at 88.

The diaphragm includes the flexing portion 68a having its outer margin clamped, as indicated at 89, between the closure and the flange 13a, the inner margin of the flexible diaphragm 68a being held against the pressure plate 90 by a retention member 91.

The diaphragm is additionally provided with an annular flexing portion 92 which is located substantially immediately above the space between the pressure plate 90 and the outer edge of the recess 88.

A yieldingly resistant pad 93 is arranged on the flat end side of the pressure plate 90, it being observed that the said plate 90 is annularly tapered near its outer edge, as indicated at 94, so as to maintain spaced relationship with the surface of the recess 88.

An auxiliary pressure plate 95 is arranged beneath the pressure pad 93 and a pressure screw 96 engages the central portion of said plate.

The screw 96 passes through a suitable opening 96a formed in the closure 14a and is locked in position by a threaded cap 96b. In order to prevent rotation of the plate 90, we provide a pin 90a which passes through the closure 14a and engages in a suitable recess 90b formed in the under-side of the plate 90.

In the present instance, in order to prevent undue wear on the center of the plate 90, we provide a wearing plate of relatively hard material, indicated at 97, inlaid in the underside of the plate 90 and located at substantially the center thereof. This serves to take the thrust of the screw 96 transmitted through the packing 93 and while the thrust of the screw will be distributed somewhat over the plate 95, yet we find that in actual practice it is desirable to insert the wearing plate 97.

Where desired, an additional wearing plate 98 may be applied to the outer surfaces of the closure 14a and suitably welded thereto, as indicated at 99. This plate will be complementally threaded with the closure, 14a, and this gives the screw 96 additional purchase.

Having thus described our invention and illustrated its use, what we claim as new and desire to secure by Letters Patent is:

1. In a valve structure, a casing having a valve seat and a rotatable valve member engaging said seat, a chamber formed at one end of said valve casing, a flexible diaphragm extending across and dividing said chamber into two compartments, a pressure plate operatively connected to said valve member located in said chamber outwardly of said diaphragm and extending into proximate relationship with a wall of said chamber, a resilient pressure pad engaging said plate, and means for compressing said pad.

2. In a valve structure, a casing having a valve seat and a rotatable valve member engaging said seat, a chamber formed at one end of said valve casing, a flexible diaphragm extending across and dividing said chamber into two compartments, a pressure plate operatively connected to said valve member located in said chamber outwardly of said diaphragm and extending into proximate relationship with a wall of said chamber, a resilient pressure pad engaging said plate, and means extending through a wall of said casing for compressing said pad.

3. In a valve structure, a casing having a valve seat and a rotatable valve member engaging said seat, a chamber formed at one end of said valve casing, a flexible diaphragm extending across and dividing said chamber into two compartments, a pressure plate operatively connected to said valve member located in said chamber outwardly of said diaphragm and extending into proximate relationship with a wall of said chamber, a resilient pressure pad engaging a substantial portion of said plate, means for compressing said pad, said means being arranged to distribute the pressure over substantially the entire surface of said plate and pad.

4. In a valve structure, a casing having a valve seat and a rotatable valve member engaging said seat, a chamber formed at one end of said valve casing, a flexible diaphragm extending across and dividing said chamber into two compartments, a pressure plate operatively connected to said valve member located in said chamber outwardly of said diaphragm and extending into proximate relationship with a wall of said chamber, means for resiliently actuating said plate to tend to hold the valve in predetermined relationship to its seat, and means for preventing rotation of said pressure plate.

5. In a valve structure, a casing having a tapered valve seat and a tapered rotatable valve member engaging said seat, means for supplying lubricant under pressure to the engaging surfaces of the valve member and its seat for moving the valve member from its seat, a chamber formed at one end of the casing and overlapping the engaging surfaces, a flexible diaphragm extending across said chamber and spaced from the valve member, a pressure plate operatively connecting the diaphragm to the valve member for normally holding the valve member to its seat, said diaphragm being movable with the valve member when the latter is moved from its seat by lubricant pressure acting on the engaging surfaces, resilient means movable into and out of engagement with said plate and means to neutralize any pressure which may be established in the chamber to act against the diaphragm to unseat the valve member.

6. In a valve structure, a casing having a tapered valve seat and a tapered rotatable valve member engaging said seat, means for supplying lubricant under pressure to the engaging surfaces of the valve member and its seat for moving the valve member from its seat, a chamber formed at one end of the casing and overlapping the engaging surfaces, a flexible diaphragm extending across said chamber and spaced from the valve member, a pressure plate operatively connecting the diaphragm to the valve member for normally holding the valve member to its seat, said diaphragm being movable with the valve member when the latter is moved from its seat by lubricant pressure acting on the engaging surfaces, resilient means movable into and out of engagement with said plate and an abutment supporting the overlapping portion of the diaphragm to render the effective flexible area substantially equal to the area of the end surface of the valve member.

7. In a valve structure, a casing having a valve seat and a valve member engaging said seat, a flexible member closing one end of the valve seat and spaced from the adjacent end of the valve member, a pressure plate supporting the flexible member and connected to said valve member, and resilient means movable into and out of engagement with the plate.

8. In a valve structure, a casing having a valve seat and a valve member engaging said seat, a flexible member closing one end of the valve seat and spaced from the adjacent end of the valve member, a pressure plate supporting the flexible member and connected to said valve member, an adjusting member movable toward and away from the plate on the side opposite the flexible member, and resilient means movable by said adjusting member into and out of engagement with the plate.

9. In a valve structure, a casing having a tapered valve seat and a tapered valve member engaging said seat, a flexible member closing the large end of the valve seat and spaced from the adjacent end of the valve member, a pressure plate supporting the flexible member and connected to said valve member, an adjusting screw carried by the casing beneath the plate, and a resilient pad secured to the screw and movable thereby into and out of engagement with said plate.

10. In a valve structure, a casing having a tapered valve seat and a tapered valve member engaging said seat, a flexible member closing the large end of the valve seat and spaced from the adjacent end of the valve member, said flexible member having an axial perforation, a pressure plate supporting the flexible member, a projection on said plate extending through said perforation, interlocking means between the projection and the valve member, a resilient pad engaging said plate opposite the projection, and an adjusting screw for compressing the pad.

11. In a valve structure, a casing having a tapered valve seat and a tapered valve member engaging said seat, a flexible member closing the large end of the valve seat and spaced from the adjacent end of the valve member, said flexible member having an axial perforation, a pressure plate supporting the flexible member, a projection on said plate extending through said perforation, means forming a seal at the junction of the projection and the flexible member, interlocking means between the projection and the valve member, a resilient pad engaging said plate opposite the projection, and an adjusting screw for compressing the pad.

12. In a valve structure, a casing having a tapered valve seat and a tapered valve member engaging said seat, a flexible member closing the large end of the valve seat and spaced from the adjacent end of the valve member, said flexible member having an axial perforation, a closure member for the casing having a centrally disposed recess therein, an annular flange on said closure defined by said recess and adapted to retain the flexible member in position, means forming a seal at the peripheral portion of said flexible member, a pressure plate in said recess and supporting the flexible member, an apertured projection on said plate extending through said perforation, a ring member surrounding said projection for retaining and sealing the flexible member and the plate at said perforation, an extension from the large end of the valve member interengaging with said apertured projection, an adjusting screw extending through said closure into said recess and being adjustable from the exterior of the casing, and a resilient pad between the screw and the pressure plate adapted to be compressed therebetween by operation of said screw.

13. In a valve structure, a casing having a tapered valve seat and a tapered valve member engaging said seat, means for supplying lubricant under pressure to the engaging surfaces of the valve member and its seat for moving the valve member from its seat, a flexible member closing the large end of the valve seat and spaced from the adjacent end of the valve member, a pressure plate supporting the flexible member and connected to said valve member, and resilient means movable into and out of engagement with the plate for regulating the pressure required to move the flexible member and said valve from its seat by pressure established in said space.

14. In a valve structure, a casing having a tapered valve seat and a tapered valve member engaging said seat, means for supplying lubricant under pressure to the engaging surfaces of the valve member and its seat for moving the valve member from its seat, a flexible member closing the large end of the valve seat and spaced from the adjacent end of the valve member, a pressure plate supporting the flexible member and connected to said valve member, resilient means movable into and out of engagement with the plate, and means to render pressure in said space ineffective to act on the flexible means to unseat the valve.

JESSE C. MARTIN, Jr.
FRANCIS N. BARD.